April 25, 1933.  A. WIKSTRAND  1,905,542
CABLE TIGHTENING AND HOLDING DEVICE FOR LOAD PULLING APPARATUS
Filed Dec. 19, 1929
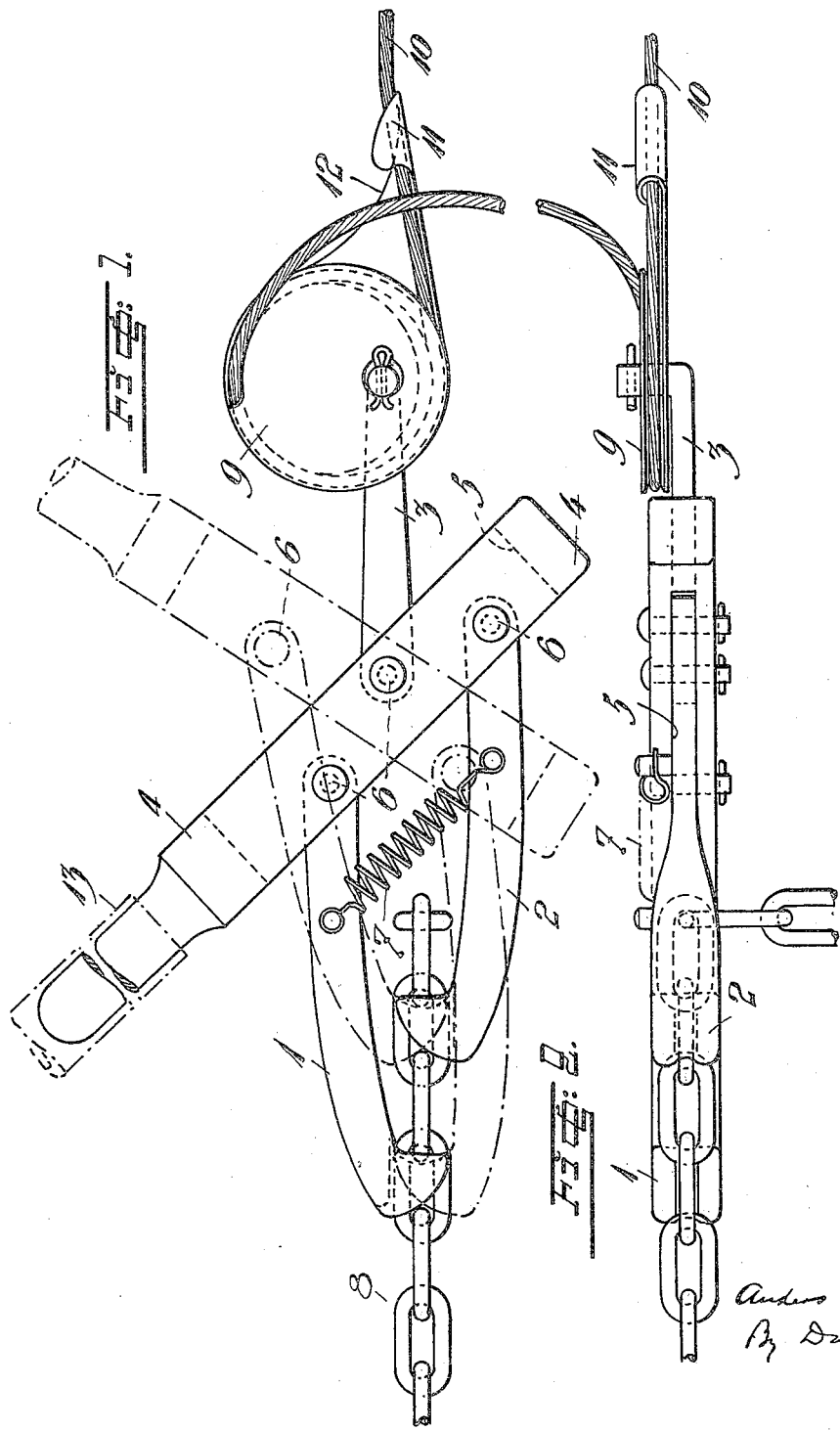

Patented Apr. 25, 1933

1,905,542

UNITED STATES PATENT OFFICE

ANDERS WIKSTRAND, OF MORA, SWEDEN

CABLE TIGHTENING AND HOLDING DEVICE FOR LOAD PULLING APPARATUS

Application filed December 19, 1929, Serial No. 415,288, and in Sweden June 7, 1929.

This invention relates to improvements in cable pulling devices and more particularly to the cable tightening and holding means forming an essential part thereof and which provides for an easy connection with or disconnection from the free end of the cable when installing the device in position for operation.

The invention is illustrated in the accompanying drawing, in which

Fig. 1 shows a side view of the pulling device with the improved cable tightening means attached thereto, and Fig. 2 is an edge view of the parts shown in Fig. 1.

In Fig. 1, 4 designates the double acting lever device which swings back and forth, and to which are articulated two laterally projecting hook-shaped arms 1 and 2, while a third arm 3 is articulated to the lever device 4. For bringing about the articulated connection between the arms 1—3 and the lever device 4 the latter can either be provided with a groove 5, in which the arms are meant to be inserted on hitching up the lever device 4 or one end of the arms may also be made forked, so that they surround or respectively rest against the sides of the lever device 4. Strong bolts 6 or possibly screws secure good guidance for the arms in relation to the lever device 4. The point of articulation of arm 3 is preferably located in the centre between the points of articulation of arms 1 and 2, and between the arms 1 and 2 is located a spring 7 which normally draws the arms toward each other. This spring 7 may be replaced by some other spring device, e. g. a leaf-spring for each one of the arms 2 and 3. The latter's free ends are on the sides facing one another provided with grooves of approximately the same width as the diameter of the links on a chain 8, so that the arms 1 and 2 on the lever device swinging back and forth are guided along the links of the chain and automatically engage alternately some links in the chain on the same level. By this means automatic climbing of the arms 1 and 2 along the chain is obtained, the necessary power in the salvage of a ditch motor car or the like being capable of attainment according to the lengths of the arms in the lever device. The hook-shaped arms 1 and 2 are furthermore at their ends on the sides facing one another bevelled in such a manner that on the lever device swinging back and forth they can be alternately and automatically made to disengage the rings, so that perfectly automatic climbing of the lever device along the chain is attained.

In salving for example a ditched motor car or the like the free end of the chain 8 is attached to a tree or some other fixed and rigid support at a suitable spot on the opposite side of the road, while with a cable 10 or the like one ties together by way of example one of the front springs of the car with the improved cable tightening and holding device consisting of the round and eccentrically attached disc 9 on the lever or arm 3. This disc 9 is provided with a bevelled groove in its circumference and a projecting arm 12 provided with a cable engaging hook 11 at its free end thereby constituting a movable attachment for the cable 10 or the like one end of which is intended to be wound spirally one and a half turns round the disc 9. After the wire has been wound one and a half turns round the disc, it is turned in such a way that the hook 11 is made to embrace the wire 10 as shown in Fig. 1. In this way the cable 10 and the chain 8 can be stretched to the necessary degree, after which, by swinging the lever device 4 back and forth the distance between the tree and the car, is, so to say, shortened.

Of course, the above described method of operation for the salvage device here referred to can be changed in such a way that the chain 8 is attached to the car, while the wire in such case is attached to the tree or some other fixed point. The lever device operates also in this case precisely in the same manner as described hereabove.

The new device can also to advantage be used for hauling up boats on to a slip, pulling up stumps of trees and otherwise for lifting up and removing different kinds of heavy objects.

The various details of the invention can as a matter of course be varied in several ways without departing from the principle of the invention.

It will be observed that it is important that the grooved disc 9 shall be eccentrically mounted upon the supporting member 3, and that the lever-actuated hook 11 shall project away from said wheel in the plane of the groove therein, it being essential that the member carrying this hook 11 shall be affixed to the wheel. By reason of this construction, after the end of the cable is wound upon the wheel sufficiently to give it a frictional hold on the periphery thereof, the cable may be given a final tightening operation by swinging the arm 12 forwardly far enough to snap the hook 11 underneath the tautened cable, so that the hook when thus engaged with the cable will prevent the strain on the cable rotating the wheel, thus holding the cable in its taut condition until the hook 11 is disengaged therefrom.

I claim:

A cable tightening and holding device embodying a supporting member, a grooved disc journalled eccentrically on said supporting member and having affixed to it a projecting arm whose free end is provided with a cable-engaging-hook lying in the plane of the groove in the disc, for the purpose set forth.

In testimony whereof I have affixed my signature.

ANDERS WIKSTRAND.